(12) United States Patent
Morishima et al.

(10) Patent No.: US 7,064,895 B2
(45) Date of Patent: Jun. 20, 2006

(54) STEREOSCOPIC IMAGE DISPLAY METHOD AND STEREOSCOPIC IMAGE DISPLAY APPARATUS USING IT

(75) Inventors: Hideki Morishima, Kawasaki (JP); Hiroshi Nishihara, Yokohama (JP); Naosato Taniguchi, Urawa (JP); Tomoshi Takikawa, Yokohama (JP); Yoshihiro Saito, Tokyo (JP); Kazutaka Inoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 09/772,989

(22) Filed: Jan. 31, 2001

(65) Prior Publication Data

US 2002/0021492 A1 Feb. 21, 2002

(30) Foreign Application Priority Data

Aug. 9, 2000 (JP) ........................ 2000-241780

(51) Int. Cl.
  *G02B 27/22* (2006.01)
  *H04N 13/04* (2006.01)

(52) U.S. Cl. .................... 359/463; 359/462; 359/464; 348/59; 348/56

(58) Field of Classification Search ............... 359/462, 359/463, 464; 348/59, 56
See application file for complete search history.

(56) References Cited

U.S. PATENT DOCUMENTS 5,663,831 A * 9/1997 Mashitani et al. .......... 359/463
5,703,717 A * 12/1997 Ezra et al. .................. 359/463
6,061,179 A * 5/2000 Inoguchi et al. ............ 359/463

FOREIGN PATENT DOCUMENTS

| EP | 0 788 008 A1 | 8/1997 |
|---|---|---|
| EP | 0977445 A2 * | 2/2000 |
| EP | 0 977 445 A1 | 2/2000 |
| EP | 1045596 A2 * | 3/2000 |
| EP | 1 045 596 A2 | 10/2000 |
| EP | 1 083 756 A2 | 3/2001 |
| EP | 1 102 106 A2 | 5/2001 |
| JP | 7-287193 | 10/1995 |
| JP | 7-306484 | 11/1995 |
| JP | 8-322067 | 12/1996 |

* cited by examiner

*Primary Examiner*—Audrey Chang
(74) *Attorney, Agent, or Firm*—Fitzpatrick, Cella, Harper & Scinto

(57) ABSTRACT

Parallax images corresponding to a plurality of different view points are each divided into predetermined stripe images, a synthetic parallax image is synthesized from the stripe images, and display light, from stripe images corresponding to one view point of the synthetic parallax image on the image display element displaying the synthetic parallax image, is guided to a mask member having a mask pattern with predetermined openings and shields by a second optical system placed in front of the image display element. The display light passing through the openings of the mask member is condensed to a position corresponding to the view point on an observation surface a predetermined distance apart, by a first optical system, whereby an observer is permitted to stereoscopically observe image information displayed on the image display element.

8 Claims, 11 Drawing Sheets

STEREOSCOPIC IMAGE DISPLAY METHOD AND STEREOSCOPIC IMAGE DISPLAY APPARATUS USING IT

BACKGROUND OF THE INVENTION

1. Field of the Invention

The present invention relates to a stereoscopic image display method that permits an observer to observe a stereoscopic image without special glasses and a stereoscopic image display apparatus using the method and, more particularly, to a stereoscopic image display method and a stereoscopic image display apparatus that are adapted to display a stereoscopic image in such a manner that a synthetic parallax image obtained by alternately arranging stripes of parallax images from two or more view points in a predetermined order is displayed on an image display element such as a CRT or an LCD, light from the image is condensed onto a mask pattern by an optical system consisting of a lenticular lens or the like placed in front of the image display element to transmit only predetermined parallax image light, and the parallax image light transmitted by the mask pattern is converged at predetermined view point positions on an observation surface by an optical system placed in front of the mask pattern, and that are preferably applicable to stereoscopic display, for example, in television, video, and computer monitors, game machines, and so on.

2. Related Background Art

The parallax barrier and lenticular methods are well-known as conventional methods of stereoscopic image display in which the image display element such as the CRT or the LCD displays the synthetic stripe parallax image obtained by alternately arranging stripes of parallax images from two or more view points in a predetermined order and in which the display light from the parallax image is guided only to the view point positions corresponding to the parallax images by the optical member placed in front of the image display element.

For example, Japanese Patent Application Laid-Open No. 9-311294 proposes the stereoscopic image display method and apparatus wherein light from an illumination light source is guided through a mask pattern having predetermined opening and shield portions so as to pattern beams transmitted thereby, the transmitted beams are provided with directivity by an optical system patterned so as to guide the patterned beams separately to the right eye and to the left eye of the observer, a transmissive image display element is interposed between the patterned optical system and the observer, and the parallax images corresponding to the right eye and to the left eye are displayed in a synthetic pattern of alternate stripes on the image display element.

In the parallax barrier and lenticular methods, the synthetic stripe parallax image is a vertical stripe synthetic parallax image in which vertically long stripes of parallax images are alternately displayed, and the directing of the parallax images toward the view points is effected by parallax barriers or lenticular lenses placed in front of pixel positions of the vertical stripe images and in front of the image display element. When an image display element having discrete pixels such as a CRT or an LCD is used as an image display element in these methods, dark portions without display light appear on the observation surface in correspondence to the so-called black matrix part between pixel and pixel, so as to narrow down the horizontal width of the effective observation area.

In the method proposed in Japanese Patent Application Laid-Open No. 9-311294, a transmissive image display element such as an LCD is used as an image display element and the directing of the display light toward the positions of the left and right eyes is effected by directing the illumination light by an optical system placed behind the image display element. In this method, crosstalk occurred in certain cases if the direction of the display light was disturbed, for example, by diffusion in the transmissive image display element such as the LCD or by diffraction in the pixel structure.

SUMMARY OF THE INVENTION

An object of the present invention is to provide a stereoscopic image display method that permits an observer to observe a stereoscopic image in a good condition and a stereoscopic image display apparatus using it, wherein the directing of the image display light toward view points is horizontally effected regardless of horizontal positions of stripe images by use of optical systems placed before and after a mask member whereby no dark portions without display light appear on the observation surface because of the so-called black matrix between pixel and pixel of the image display element and whereby the observation is theoretically free from the scattering in the image display element and from the diffraction in the pixel structure.

A stereoscopic image display method according to one aspect of the present invention is a stereoscopic image display method for permitting an observer to stereoscopically observe image information displayed on an image display element by dividing each of parallax images corresponding to a plurality of different view points, into predetermined stripe images, synthesizing a synthetic parallax image from the stripe images, guiding display light from stripe images corresponding to one view point in the synthetic parallax image on the image display element displaying the synthetic parallax image, to a mask member having a mask pattern with predetermined openings and shields by a second optical system placed in front of the image display element, and converging display light passing through the openings of the mask member to a position corresponding to the view point on an observation surface a predetermined distance apart, by a first optical system.

A stereoscopic image display apparatus according to one aspect of the present invention is an apparatus comprising an image display device for displaying a synthetic parallax image obtained by combining predetermined stripe images formed from each of parallax images corresponding to a plurality of different view points, a mask member having a mask pattern consisting of predetermined openings and shields, a second optical system disposed in front of the image display element and acting to guide display light from stripe images corresponding to one view point in the synthetic parallax image displayed on the image display element, to the mask member, and a first optical system disposed in front of the mask member, wherein display light passing through the openings of the mask member is condensed to a position corresponding to the view point on an observation surface a predetermined distance apart, by the first optical system, thereby permitting stereoscopic observation of image information displayed on the image display element.

In a further aspect of the present invention, among image display light from pixels forming each stripe image, display light reaching a position of an observer's view point corresponding to the stripe image is condensed to the mask member by the second optical system so as to pass through the openings of the mask member and the other light is intercepted by the shields.

In a further aspect of the present invention, said second optical system forms images of pixels of said image display element on said mask member in the vertical direction and a position of a focal point thereof is approximately coincident with a position of the mask member in the horizontal direction.

In a further aspect of the present invention, N view points (N is an integer not less than 2) are arranged at equal intervals on the observation surface the predetermined distance apart.

In a further aspect of the present invention, said first optical system and second optical system have predetermined periodic structure in the horizontal direction and the second optical system or/and the image display element are placed on intersecting planes of many straight lines connecting two adjacent view points out of the N view points arranged at the equal intervals in the horizontal direction and a horizontal center of each elementary optical element forming the second optical system.

In a further aspect of the present invention, said second optical system has predetermined periodic structure in each of the horizontal and vertical directions and an elementary optical element forming one period in the horizontal and vertical directions has optical action in the horizontal direction and optical action in the vertical direction different from each other.

In a further aspect of the present invention, intersecting points of many straight lines connecting two adjacent view points out of the N view points arranged at the equal intervals and a horizontal center of each elementary optical element forming said second optical system agree with horizontal centers of the respective elementary optical elements forming the second optical system or/and agree with horizontal centers of pixels forming the image display element.

In a further aspect of the present invention, the following relations are met:

$$Nd*HL1/E = Lhd/(Lhd+Lh0) \quad (h1)$$

$$Hd/HL1 = (Lh0+Lhd)/Lh0 \quad (h2)$$

$$NL2*HL1/E = LhL2/(LhL2+Lh0) \quad (h3)$$

$$HL2/HL1 = (Lh0+LhL2)/Lh0 \quad (h4)$$

$$H1/E = Lh1/(Lh1+Lh0) \quad (h5)$$

$$H1/HL1 = (Lh0+Lh1)/Lh0 \quad (h6)$$

$$H1*Lh1a/Lh1 = HL1*Lh1b/Lh1 \quad (h7)$$

$$Lh1a+Lh1b = Lh1 \quad (h8)$$

$$Hm/H1 = Lh1a/Lh1 \quad (h9)$$

where N view points (N is an integer not less than 2) are arranged at equal intervals E on the observation surface the predetermined distance apart, HL1 is a horizontal period of elementary optical elements forming said first optical system, Hm a horizontal width of the openings of said mask member, HL2 a horizontal period of elementary optical elements forming said second optical system, Hd a horizontal pixel pitch of the image display element, LhL2 and Lhd an optical reduced distance between the first optical system and the second optical system and an optical reduced distance between the first optical system and the image display element, respectively, Lh0 an optical reduced distance from the observation surface to the first optical system, Lh1 an optical reduced distance from the first intersecting plane, when counted from the first optical system toward the image display element, out of intersecting planes of line groups connecting two adjacent view points out of the N view points and each pixel of the image display element, to the first optical system, Lh1a and Lh1b an optical reduced distance from the first optical system to the mask member and an optical reduced distance from the mask member to the first intersecting plane from the first optical system out of the intersecting planes, and Nd and NL2 integers not less than 2 (Nd>NL2).

In a further aspect of the present invention, relations of Eq. (V1N) to Eq. (V3N) or relations of Eq. (V1N) to Eq. (V4N) below are met:

$$Vd:Vm = LV1:LV2 \quad (V1N)$$

$$2 \cdot N \cdot Vd:VL = LV1+LV2:LV2 \quad (V2N)$$

$$1/LV1+1/LV2 = 1/fV \quad (V3N)$$

$$N \cdot Vd:VL = LV0+LV1+LV2:LV0+LV2 \quad (V4N)$$

where Vd is a vertical pixel pitch of said image display element, Vm a vertical width of the openings or the shields of the mask pattern of said mask member, LV1 an optical reduced distance from the image display element to a surface of the second optical system having optical action in the vertical direction, LV2 an optical reduced distance from the surface of the second optical system having the optical action in the vertical direction to the mask pattern, fV a vertical focal length of individual elementary optical elements forming the second optical system, LV0 an optical reduced distance between the mask pattern and the observation surface, and N the number of view points (N is an integer not less than 3).

In a further aspect of the present invention, relations of Eq. (V1) to Eq. (V3) or relations of Eq. (V1) to Eq. (V4) below are met:

$$Vd:Vm = LV1:LV2 \quad (V1)$$

$$2 \cdot Vd:VL = LV1+LV2:LV2 \quad (V2)$$

$$1/LV1+1/LV2 = 1/fV \quad (V3)$$

$$Vd:VL = LV0+LV1+LV2:LV0+LV2 \quad (V4)$$

where said number of view points is 2, Vd is a vertical pixel pitch of said image display element, Vm a vertical width of the openings or the shields of the mask pattern of said mask member, LV1 an optical reduced distance from said image display element to a surface of said second optical system having optical action in the vertical direction, LV2 an optical reduced distance from the surface of the second optical system having the optical action in the vertical direction to the mask pattern, fV a vertical focal length of individual elementary optical elements forming the second optical system, and LV0 an optical reduced distance between the mask pattern and the observation surface.

In a further aspect of the present invention, said first and second optical systems comprise microlens arrays.

In a further aspect of the present invention, said first and second optical systems comprise lenticular lenses.

In a further aspect of the present invention, said second optical system is comprised of a lenticular lens in which cylindrical lenses being long in the vertical direction and having an optical power only in the horizontal direction are arranged at predetermined intervals in the horizontal direction and a lenticular lens in which cylindrical lenses being long in the horizontal direction and having an optical power only in the vertical direction are arranged at predetermined intervals in the vertical direction.

In a further aspect of the present invention, said second optical system is a microlens array in which toroidal lenses having a focal length in the vertical direction and a focal length in the horizontal direction different from each other are arranged in a predetermined period in the horizontal direction and in a predetermined period in the vertical direction.

In a further aspect of the present invention, a stereoscopic image display method is carried out with an image display element and a mask member having a mask pattern with predetermined openings and shields, and directing of image display light from said image display element is effected by a first optical system and a second optical system placed before and after said mask pattern.

DETAILED DESCRIPTION OF THE PREFERRED EMBODIMENTS (Embodiment 1)

Figure 1:
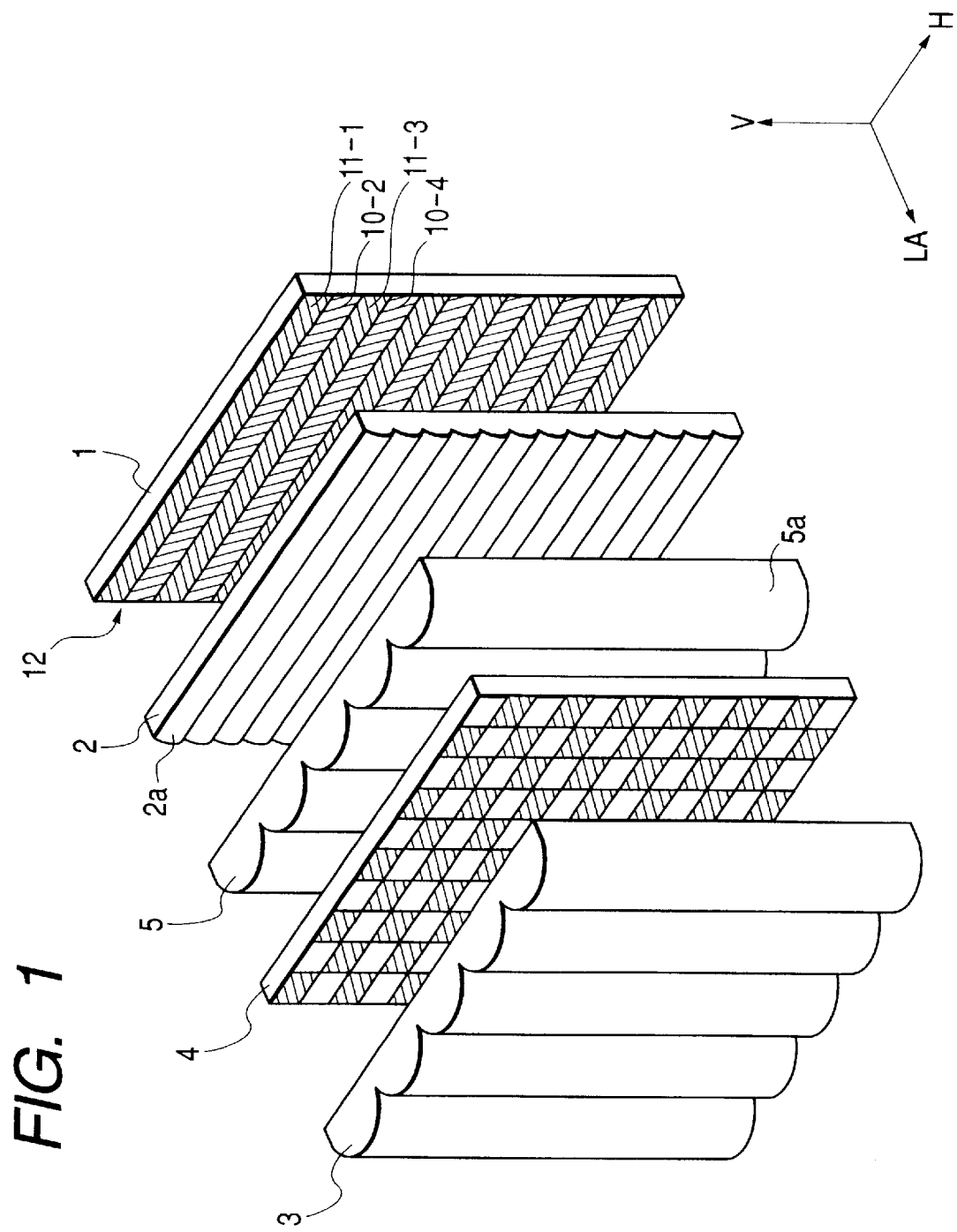
FIG. 1 is a perspective view to show the major part of Embodiment 1 of the present invention.

FIG. 1 is a perspective view of the major part to illustrate Embodiment 1 of the present invention. In the figure, H represents the horizontal direction (the lateral direction), V the perpendicular direction (the vertical direction), and LA the direction of the optical axis. The image display element 1 displays a synthetic horizontal stripe parallax image synthesized from parallax images of two view points or two or more view points described hereinafter. Reference numeral 2 designates a horizontal lenticular lens, which has a refracting power in the vertical direction V. Numeral 3 denotes a first vertical lenticular lens, which has a refracting power in the horizontal direction H. Numeral 4 indicates a checkered opening mask and 5 a second vertical lenticular lens, which has a refracting power in the horizontal direction H. Here the horizontal lenticular lens 2 and the second vertical lenticular lens 5 compose an element of the second optical system. The first vertical lenticular lens 3 composes an element of the first optical system.

Figure 2B:
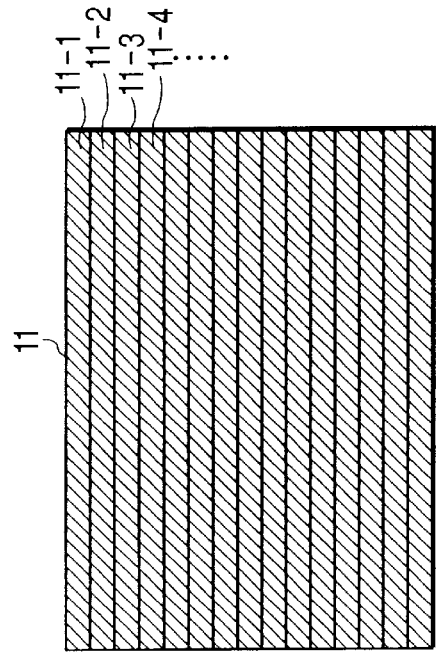
FIGS. 2A, 2B, and 2C are explanatory diagrams to illustrate a synthetic horizontal parallax image displayed on the image display element in Embodiment 1 of the present invention.
Figure 2A:
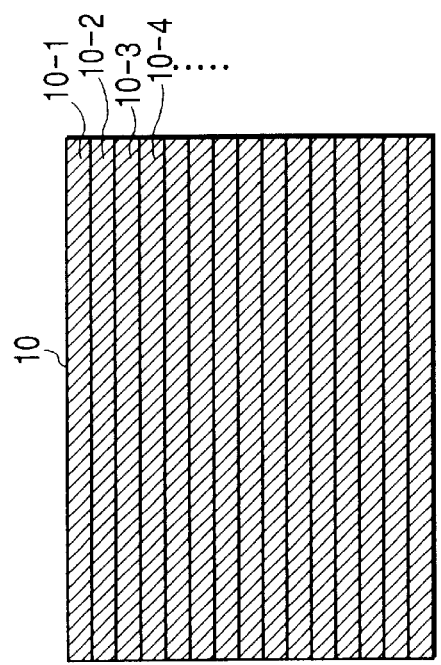
Figure 2C:
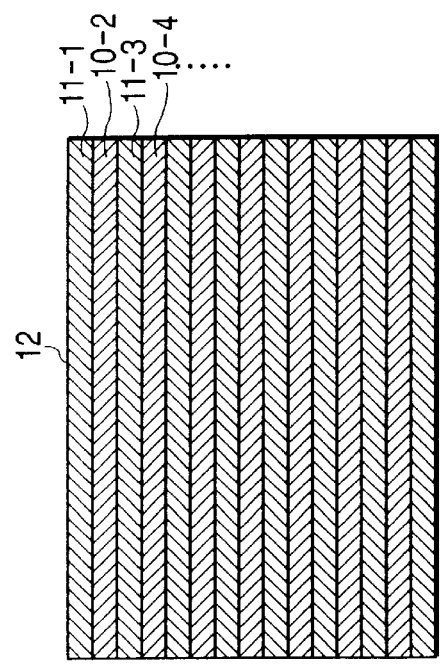

FIGS. 2A to 2C are explanatory diagrams to illustrate the synthetic horizontal stripe parallax image displayed on the image display element 1. FIG. 2A shows a parallax image for the right eye, FIG. 2B a parallax image for the left eye, and FIG. 2C the synthetic horizontal stripe parallax image.

The synthetic horizontal stripe parallax image 12 is synthesized by dividing the parallax images 10, 11 corresponding to the right and left eyes of the observer, respectively, into horizontally long stripe images (10-1, 10-2 . . . , 11-1, 11-2 . . . ) and alternately arranging the stripe images in the vertical direction. In this embodiment the division into the horizontal stripe images is division every horizontal scan line of the image display element 1 (e.g., FIG. 1).

It is assumed in Embodiment 1 that the odd lines of the synthetic horizontal stripe parallax image are the stripes of the parallax image for the left eye (11-1, 11-3, 11-5 . . . ) and the even lines the stripes of the parallax image for the right eye (10-2, 10-4, 10-6 . . . ).

Figure 4:
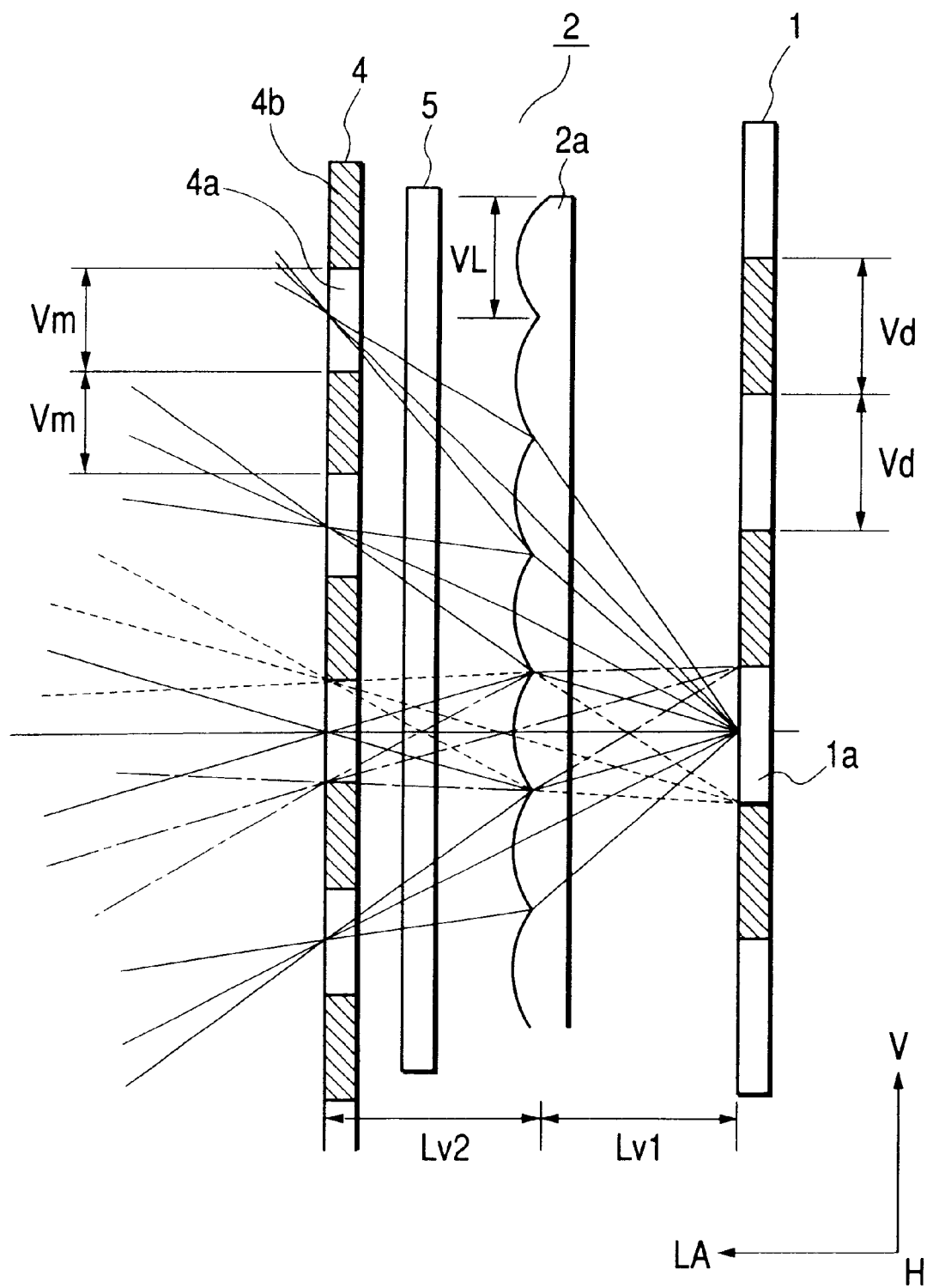
FIG. 4 is a vertical cross-sectional view for explaining the action in the vertical direction in Embodiment 1 of the present invention.

The optical principle of the present embodiment will be described referring back to FIG. 1. One cylindrical lens 2a, which forms the horizontal lenticular lens 2, which is long in the horizontal direction, and which has curvature only in the vertical direction, corresponds to each pixel horizontal line 11-1, 10-2, 11-3, 10-4 . . . of the synthetic horizontal stripe parallax image displayed on the image display element 1 and pixel display light from each pixel 1a of the image display element 1 is focused on the checkered opening mask 4, as illustrated in FIG. 4, in the vertical section (or in the V-LA section).

Figure 3:
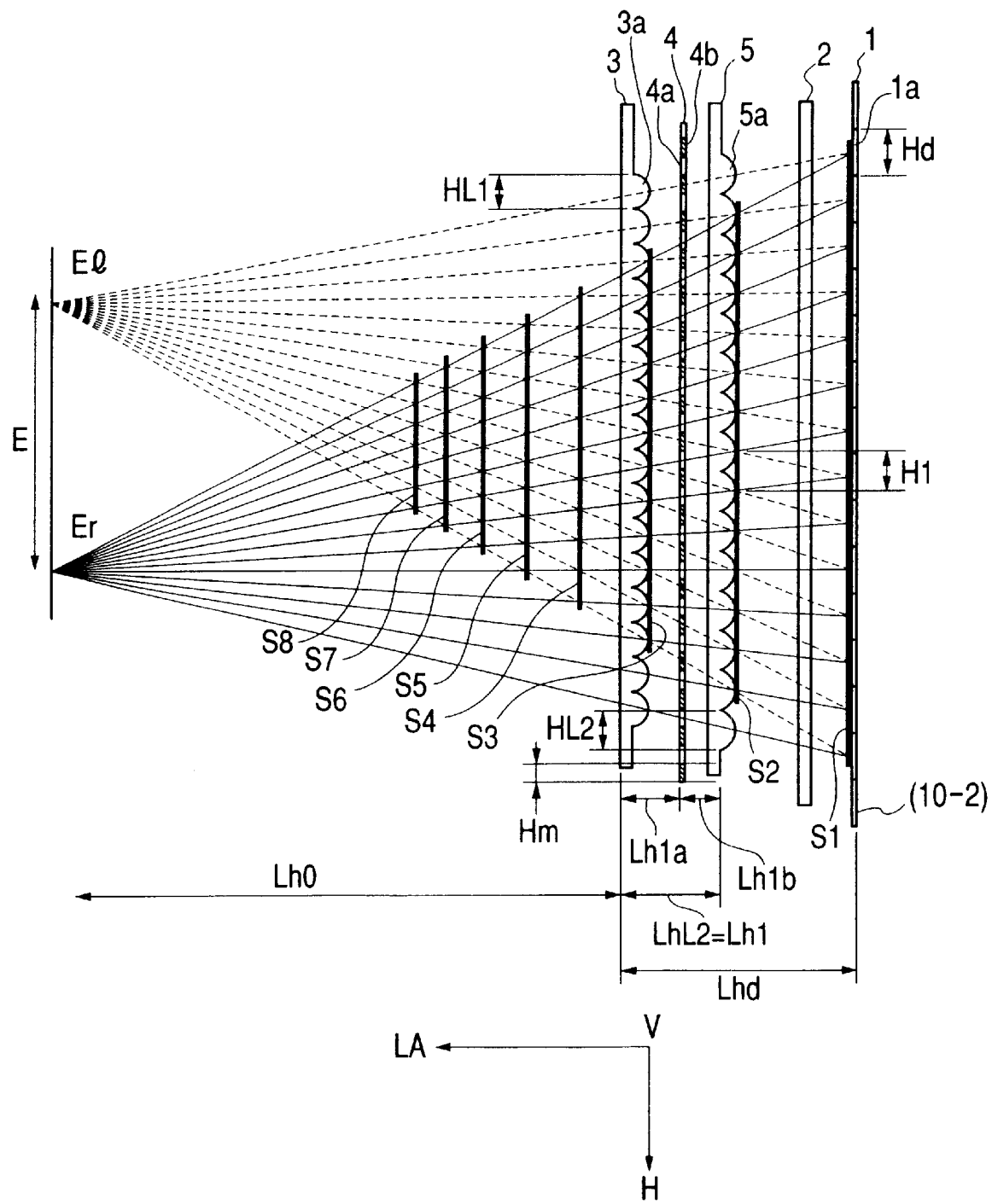
FIG. 3 is a horizontal cross-sectional view for explaining the action in the horizontal direction in Embodiment 1 of the present invention.

In the horizontal direction the image display light emitted from each pixel is condensed on the checkered mask 4, as illustrated in FIG. 3, by the second vertical lenticular lens 5.

The checkered opening mask 4 is placed on the focal plane of the cylindrical lenses 5a, which constitute the second vertical lenticular lens 5, which are long in the vertical direction, and which have curvature only in the horizontal direction.

When fh2 represents the focal length of the cylindrical lenses 5a forming the second vertical lenticular lens 5, the image display light from each pixel 1a intersects with the checkered opening mask 4 at a position horizontally shifted by fh2*tan(aH) from the center of each cylindrical lens with respect to a horizontal angle of incidence aH into the cylindrical lens 5a.

One horizontal line of openings 4a and shields of the checkered opening mask 4 corresponds to one horizontal line of the synthetic horizontal stripe parallax image and in the horizontal direction a pair of one opening and one shield corresponds to one cylindrical lens 3a forming the first vertical lenticular lens 3.

The layout of the opening and shield portions of the horizontal even lines on the checkered opening mask 4 is defined so that among the image display light from the pixels of the right-eye lines (the even lines of the synthetic horizontal stripe parallax image 10-2, 10-4, . . . ) in the synthetic horizontal stripe parallax image 12, the light traveling to the position of the observer's right eye Er is converged to the opening portions 4a of the checkered opening mask 4 by the second vertical lenticular lens 5 while the image display light traveling to the position of the observer's left eye El is intercepted by the shield portions 4b of the checkered opening mask 4.

The layout of the openings and shields of the horizontal odd lines in the checkered opening mask 4 is set so that the positions of the opening and shield portions are replaced with each other from the layout of the opening and shield portions of the horizontal even lines, thereby forming the checkered pattern of the opening and shield portions as a whole.

The image display light transmitted by the checkered mask 4 is projected onto the observer's left and right eyes by the first vertical lenticular lens 3.

The checkered opening mask 4 is on the focal plane of the first vertical lenticular lens 3, so that only the parallax image display light for the left eye (11-1, 11-3, . . . ) reaches the left eye El and the parallax image display light for the right eye (10-2, 10-4, . . . ) reaches the right eye Er of the observer at a predetermined distance determined by the opening positions of the checkered opening mask 4 and the first vertical lenticular lens 3.

Next described is the mutual relation where design parameters are preferably set in the stereoscopic image display apparatus of the present invention using the first vertical lenticular lens 3, the horizontal lenticular lens 2, the checkered opening mask 4, and the second vertical lenticular lens 5.

FIG. 3 is a cross-sectional view (V-LA section) obtained by cutting the stereoscopic image display apparatus of the present embodiment by a horizontal plane including a right-eye image line (even line) of the image display element 1, in which the same members are denoted by the same reference symbols as those in the figures heretofore.

In the stereoscopic image display apparatus of the present invention, the horizontal action and the vertical optical action can be separately considered and the discussion with FIG. 3 concerns the action in the horizontal direction.

In FIG. 3 the image display light traveling toward the right eye Er is indicated by solid lines and the image display light traveling toward the left eye El by dashed lines.

As is apparent from FIG. 1 and FIG. 2, the planes including these two ray groups are shifted from each other in the vertical direction by the width of a scan line of the image display element 1.

In the present embodiment it is desirable to locate the vertex of a cylindrical lens 3a forming the first vertical lenticular lens 3, the center of an opening 4a or a shield portion 4b of the checkered opening mask 4, and the vertex of a cylindrical lens 5a forming the second vertical lenticular lens 5 on a straight line connecting the position of the observer's left or right eye and each pixel on the horizontal pixel line of the image display element 1.

It is possible to display a stereoscopic image without meeting this condition as long as the relation is maintained between the checkered mask 4 and the first lenticular lens 3. In that case, however, utilization efficiency of light from the image display element 1 will be lowered depending upon placement and there is a possibility that some pixels become dark.

In the construction of the stereoscopic image display apparatus of the present invention as illustrated in FIG. 3, the cylindrical lenses of the first vertical lenticular lens 3 and second vertical lenticular lens 5 can be placed on planes where the straight line-groups meet (intersecting planes), S1, S2, . . . , Sn, where the two points El, Er being the positions of the left and right eyes are connected with the pixels on the horizontal pixel lines of the image display element 1.

In FIG. 3 the second vertical lenticular lens 5 is placed on the first intersecting plane S2 from the first vertical lenticular lens 3 and the image display element 1 on the second intersecting plane S1 from the lens 3. The horizontal lenticular lens 2 can be placed at any position satisfying the conditions in the vertical direction described hereinafter and not interfering with the other members, regardless of these conditions. (In FIG. 3 the horizontal lenticular lens 2 is interposed between the image display element 1 and the second vertical lenticular lens 5.)

The checkered mask 4 is placed between the first vertical lenticular lens 3 and the second lenticular lens 5 and on a plane on which the straight lines (dashed lines) connecting the left eye El and the pixels of the image display element 1 and the straight lines (solid lines) connecting the right eye Er and the pixels of the image display element 1 are equally spaced. In the above placement the stereoscopic image display apparatus of the present invention satisfies the following relations of design parameters concerning the horizontal direction.

$$Nd*HL1/E=Lhd/(Lhd+Lh0) \quad \text{(h1)}$$

$$Hd/HL1=(Lh0+Lhd)/Lh0 \quad \text{(h2)}$$

$$NL2*HL1/E=LhL2/(LhL2+Lh0) \quad \text{(h3)}$$

$$HL2/HL1=(Lh0+LhL2)/Lh0 \quad \text{(h4)}$$

$$H1/E=Lh1/(Lh1+Lh0) \quad \text{(h5)}$$

$$H1/HL1=(Lh0+Lh1)/Lh0 \quad \text{(h6)}$$

$$H1*Lh1a/Lh1=HL1*Lh1b/Lh1 \quad \text{(h7)}$$

$$Lh1a+Lh1b=Lh1 \quad \text{(h8)}$$

$$Hm/H1=Lh1a/Lh1 \quad \text{(h9)}$$

$$fh2=LhL2-Lh1a \quad \text{(h10)}$$

$$fh1=Lh1a \quad \text{(h11)}$$

In the above equations, HL1 and HL2 represent the pitches of the first and second vertical lenticular lenses 3, 5, respectively, Hd and Hm the horizontal pixel pitch of the image display element 1 and the horizontal width of the openings or shields of the checkered mask 4, H1 the horizontal pitch between intersections of the aforementioned ray groups on the first intersecting plane from the first vertical lenticular lens 3, Nd and NL2 positive integers indicating that the image display element 1 and the second vertical lenticular lens 5 are placed on the Nd-th intersecting plane and on the NL2-th intersecting plane, respectively, of the aforementioned ray groups from the first vertical lenticular lens 3, LhL2 and Lhd optical reduced distances from the first vertical lenticular lens 3 to the second vertical lenticular lens 5 and to the image display element 1, respectively, Lh0 an optical reduced distance from the observer to the first vertical lenticular lens 3, Lh1 a distance from the first vertical lenticular lens 3 to the first intersecting plane of the aforementioned ray groups therefrom, Lh1a and Lh1b an optical reduced distance from the first optical system to the mask member and an optical reduced distance from the checkered mask 4 to the first intersecting plane, and fh1 and fh2 the focal lengths of the individual cylindrical lenses 3a, 5a forming the first and second vertical lenticular lenses 3, 5, respectively. When the design parameters satisfy the above relations, the display light to the right eye is separated well from the display light to the left eye.

In the embodiment illustrated in FIG. 3 the second vertical lenticular lens 5 is located on the first intersecting plane S2, but the relations of Eq. (h6) to Eq. (h9) must hold, irrespective of whether the second vertical lenticular lens 5 is placed on the first intersecting plane S2.

Eqs. (h1) to (h11) do not have to hold exactly, and the 3D display can be implemented in certain cases where approximately equal relations hold (within ±20%). This also applies to the equations below.

Figure 11:
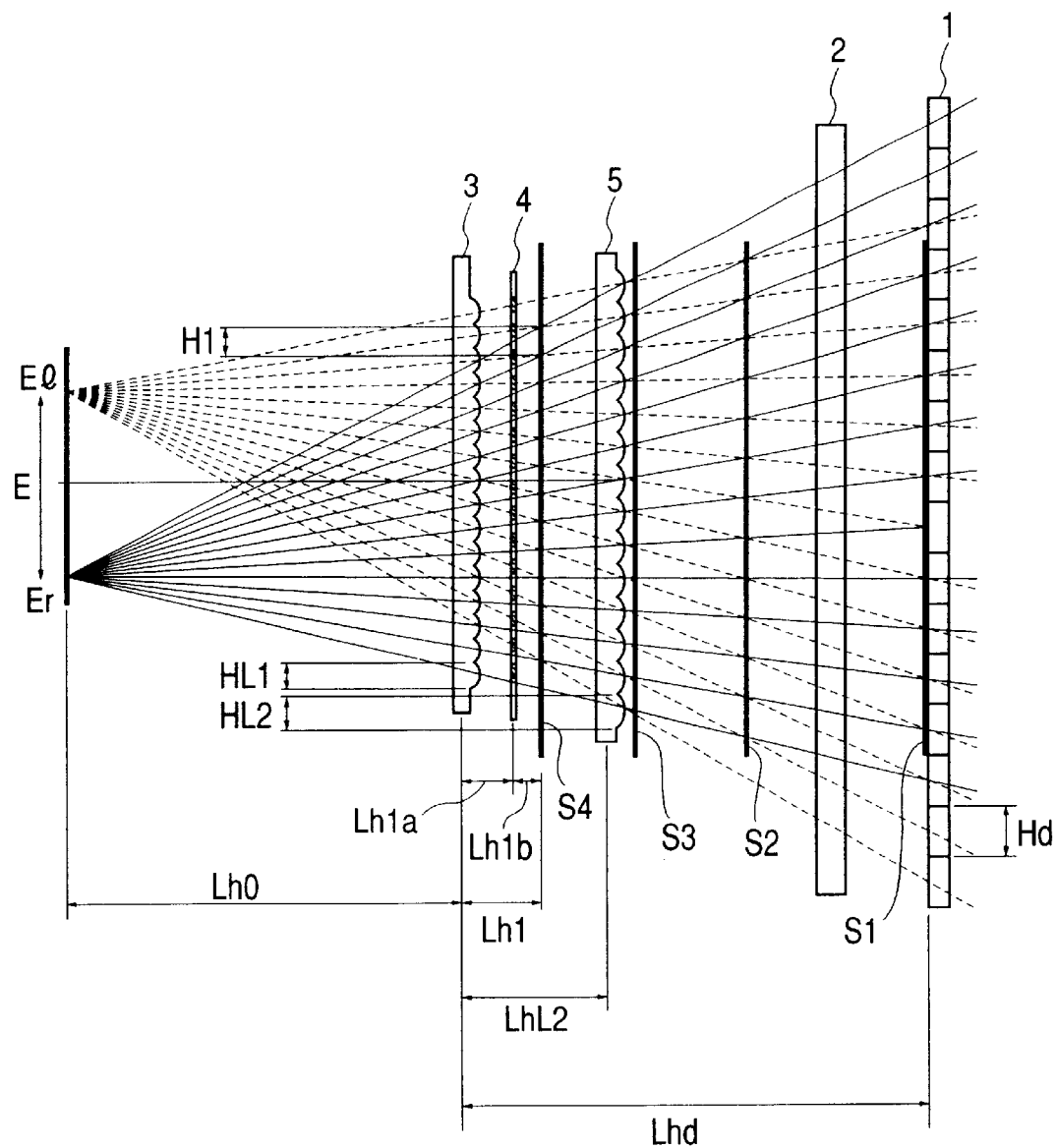
FIG. 11 is a horizontal cross-sectional view for explaining the action in the horizontal direction in an example wherein the locations of the second vertical lenticular lens and image display element are changed from the structure illustrated in FIG. 3 in Embodiment 1 of the present invention.

FIG. 11 shows a configuration example in which the image display element 1 and the second vertical lenticular lens 5 are placed on the fourth intersecting plane S1 and on the second intersecting plane S3 of the aforementioned ray groups from the first vertical lenticular lens 3 (a case of Nd=4 and NL2=2). The same members as those in FIG. 3 are denoted by the same reference symbols. In this configuration example the display light to the right eye is also separated well from the display light to the left eye when the aforementioned relations of Eq. (h1) to Eq. (h9) hold.

In the present invention, as described above, the locations of the second vertical lenticular lens 5 and the image display element 1 have degrees of freedom; for example, even in the case wherein the image display element 1 is an LCD or the like, a liquid crystal layer or the like actually displaying an image is placed between glass substrates of a predetermined thickness, and the members such as the second vertical lenticular lens 5 and the horizontal lenticular lens 2 cannot be placed immediately next to the image display element 1, there are possible configurations permitting good stereoscopic image display.

In the case wherein the utilization efficiency of the image light from the image display element 1 does not have to be set high, the display of stereoscopic image can be implemented even if all the aforementioned relations are not met or even if some of them are met. In that case, the conditions to be met are Hm:E=Lh1a:Lh0, aforementioned Eq. (h11), and the relations in the vertical direction described hereinafter.

Next, the relations in the vertical direction (V-LA section) in the present embodiment will be described referring to FIG. 4.

FIG. 4 is a schematic view from the side of the stereoscopic image display apparatus of the present embodiment (the V-LA section), in which the same members as those in the figures before are denoted by the same reference symbols. Each cylindrical lens 2a forming the horizontal lenticular lens 2 corresponds to one horizontal line of the image display element 1 and focuses the horizontal line on one horizontal line composed of the openings 4a and shields 4b on the checkered mask 4 in the vertical section.

For effecting this optical action in good order, the following relations need to be met by the design parameters concerning the vertical direction of the stereoscopic image display apparatus.

$$Vd:Vm=LV1:LV2 \qquad (V1)$$

$$2 \cdot Vd:VL=LV1+LV2:LV2 \qquad (V2)$$

$$1/LV1+1/LV2=1/fV \qquad (V3)$$

In these relations, Vd represents the vertical pitch of the pixels of the image display element 1, Vm the vertical width of the openings 4a or the shields 4b of the checkered mask 4, LV1 an optical reduced distance from the image display element 1 to the horizontal lenticular lens 2, LV2 an optical reduced distance from the horizontal lenticular lens 2 to the checkered mask 4, and fV the focal length of the cylindrical lenses 2 forming the horizontal lenticular lens 2.

Eq. (V1) defines the condition for focusing one horizontal stripe image of the image display element 1 in the exact width on one horizontal line on the checkered mask 4, and Eq. (V3) is the condition for defining the focal length in the vertical direction (in the V-LA section) of the horizontally long individual cylindrical lenses 2a forming the lateral lenticular lens 2, necessary for the focusing. Eq. (V2) is the condition for preventing the image light from one horizontal stripe image of the image display element 1 from undergoing left-to-right inversion to cause crosstalk even if it passes through the horizontally long cylindrical lenses 2 not corresponding to the horizontal stripe image in the horizontal lenticular lens 2.

Further, it becomes feasible to make the utilization efficiency of the image light high and make the horizontal stripes of the lateral lenticular lens 2 unobtrusive, by aligning the observer's eye E, the center of each opening of the checkered mask 4, the center of each individual cylindrical lens 2 forming the horizontal lenticular lens 2, and the center of the pixel of the image display element 1 on a straight line in the vertical section.

In this construction of the stereoscopic image display apparatus of the present invention, it is preferable to satisfy the following relation, in addition to Eq. (V1) to Eq. (V3);

$$Vd:VL=LV0+LV1+LV2:LV0+LV2 \qquad (V4),$$

where LV0 is an optical reduced distance from the checkered mask 4 to the observer.

As described previously, the relations in the vertical direction are independent of those in the horizontal direction and the lateral lenticular lens 2 can be freely placed at any position satisfying Eq. (V1) to Eq. (V4) and not interfering with the other members.

The action of the second vertical lenticular lens 5 and the horizontal lenticular lens 2 can also be realized by a single microlens array having the refracting power in the horizontal direction and in the vertical direction.

Figure 5:
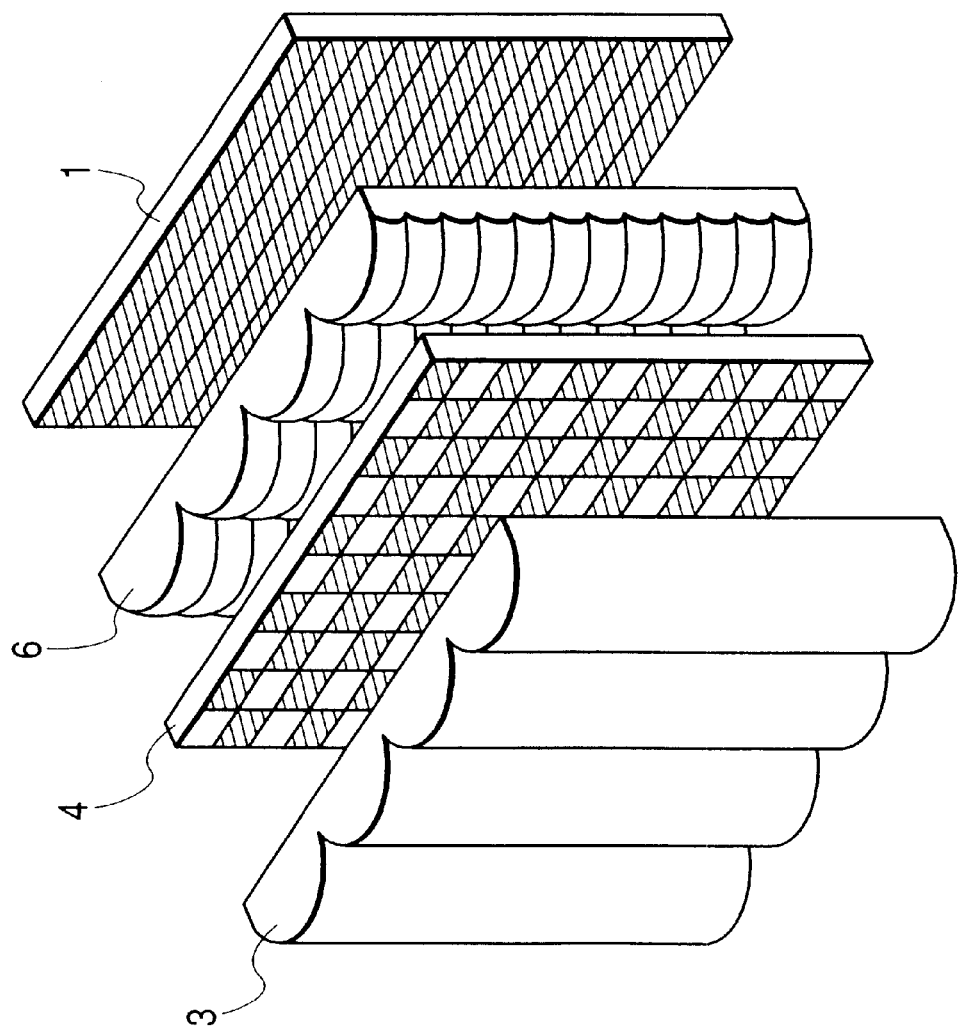
FIG. 5 is a perspective view to show another form of Embodiment 1 of the present invention.

FIG. 5 is a schematic diagram to show an embodiment of the present invention using the microlens array 6, in which the same members as those in FIG. 1 before are denoted by the same reference symbols.

The microlens array 6 is a microlens array of toroidal lenses having vertical and horizontal curvatures basically different from each other (or possibly equal to each other) and arranged in the horizontal and vertical directions, and the horizontal lines of the microlenses correspond to the horizontal pixel lines of the image display element 1. The vertical curvature of the toroidal lenses is set so as to image the pixels of the image display element 1 on the checkered mask 4 and the horizontal curvature is set so as to focus the parallel beams from the image display element on the checkered mask 4.

The horizontal pitch and the vertical pitch of the microlenses 6 can be determined so as to satisfy the same relations as the pitch of the second vertical lenticular lens 5 and the pitch of the horizontal lenticular lens 2, respectively, in the case of the structure including the first and second vertical lenticular lenses 3, 5 and the horizontal lenticular lens 2. However, in the case of the microlens array 6 being used, the optical distance from the image display element 1 to the second vertical lenticular lens 5 and the optical distance from the image display element 1 to the horizontal lenticular lens 2 are degenerated to the optical distance from the image display element 1 to the microlens array 6, and the optical distance from the second lenticular lens 5 to the checkered mask 4 and the optical distance from the horizontal lenticular lens 2 to the checkered mask 4 are degenerated to the optical distance from the microlens array 6 to the checkered mask 4.

Further, it is also possible to use hologram optical elements or the like as the first and second optical systems. For example, the first optical system can be a hologram optical element in which elementary hologram elements (with the horizontal focal length of fh1 and with no optical power in the vertical direction) having the same optical power as the cylindrical lenses of the first vertical lenticular lens 3 in the present embodiment are arranged in the period of HL1 in the horizontal direction, and the second optical system can be a hologram optical element in which elementary hologram elements having the same horizontal and vertical focal lengths as the microlens array 6 described in FIG. 5 are arranged in the same period as the microlens array 6, in the horizontal and vertical directions.

(Embodiment 2)

Figure 6:
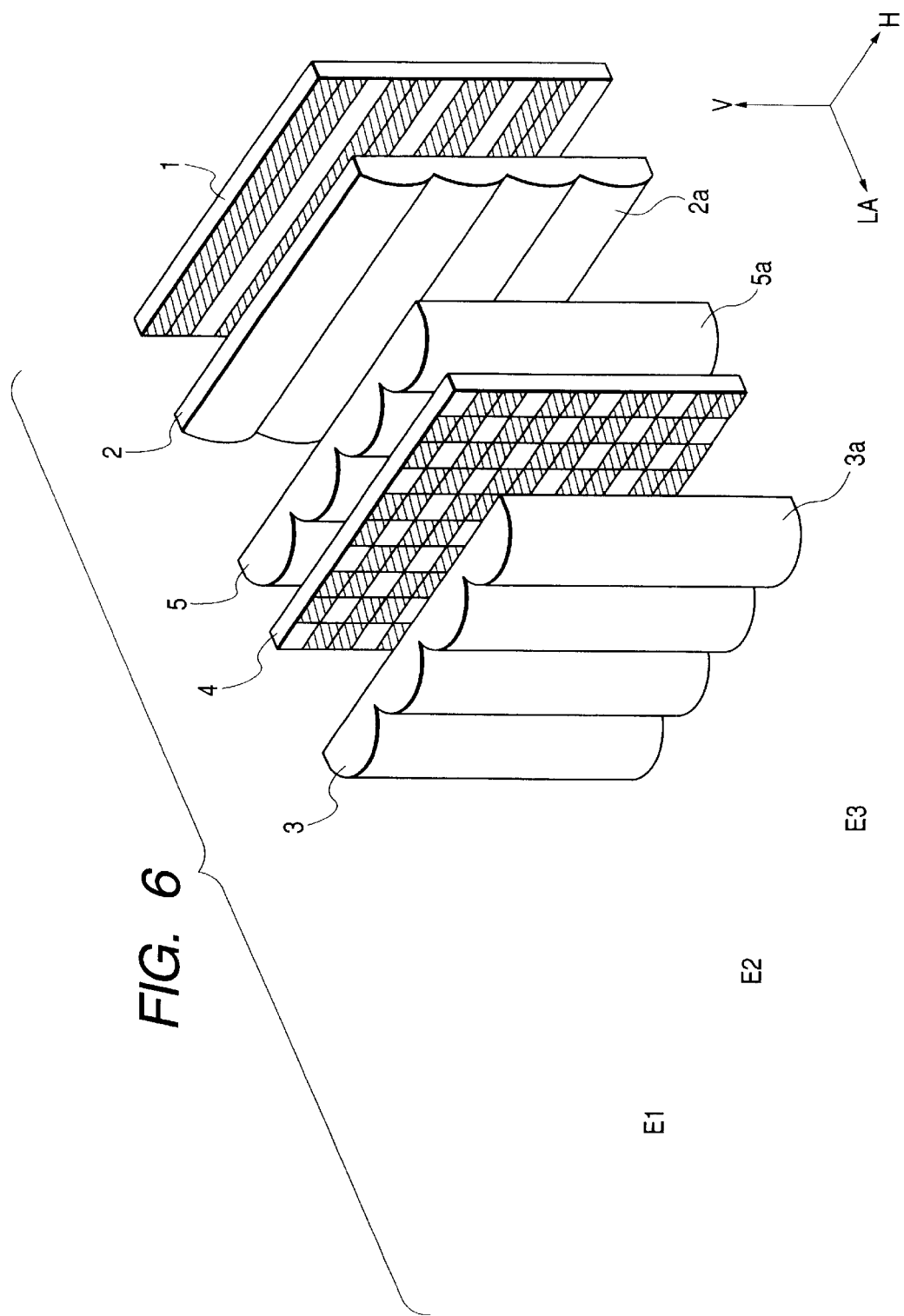
FIG. 6 is a perspective view to show the major part of Embodiment 2 of the present invention.

FIG. 6 is an explanatory diagram to illustrate Embodiment 2 of the present invention. The same members as those in FIG. 1 are denoted by the same reference symbols. The present embodiment is different from Embodiment 1 in that the number of view points is increased from 2 to a number N greater than 2 (i.e., an integer larger than 2). In this example the case of N=3 will be described in particular.

FIGS. 7A to 7D are explanatory diagrams to show a synthetic horizontal stripe parallax image displayed on the image display element 1.

Figure 7A:
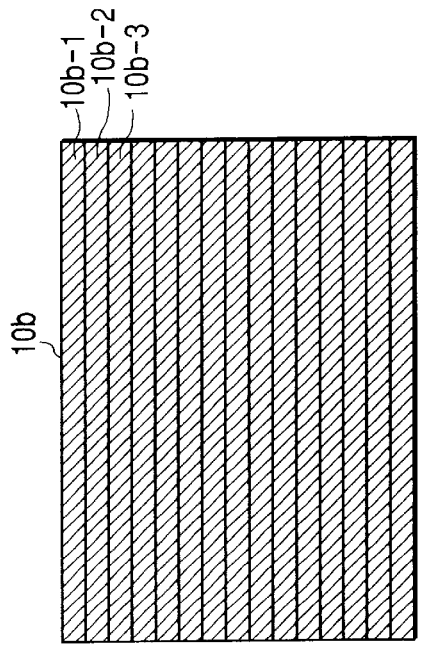
FIGS. 7A, 7B, 7C, and 7D are explanatory diagrams to illustrate a synthetic horizontal parallax image displayed on the image display element in Embodiment 2 of the present invention.
Figure 7B:
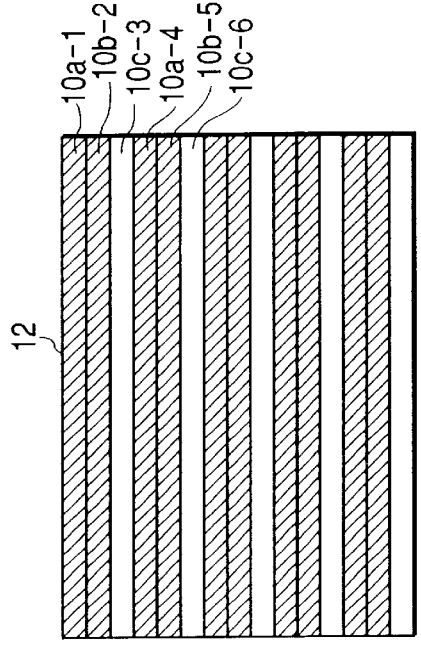
Figure 7C:
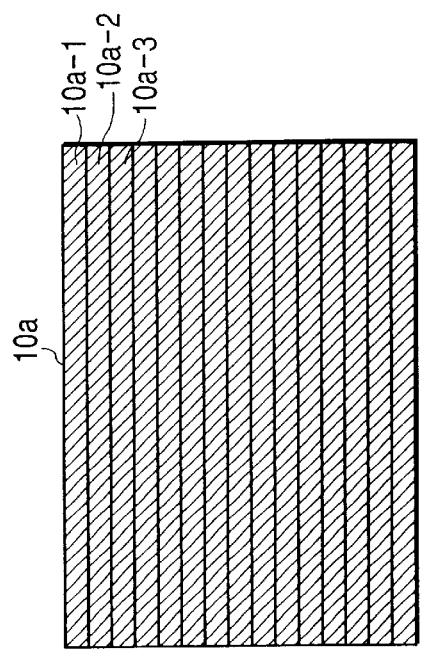
Figure 7D:
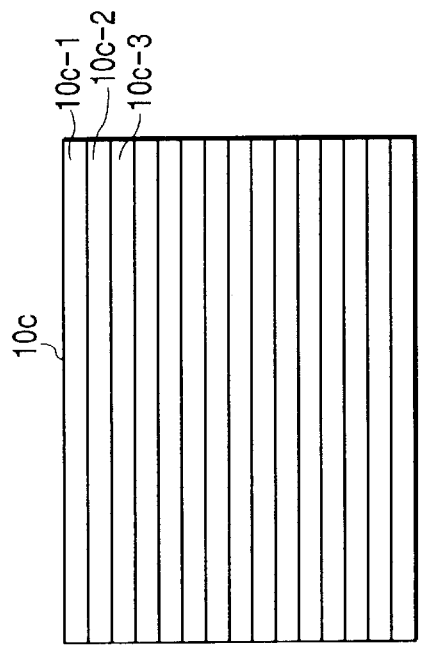

FIGS. 7A, 7B, and 7C show the parallax images 10a, 10b, 10c corresponding to the first, second, and third view points in order, and FIG. 7D shows the synthetic horizontal stripe parallax image 12 constructed by dividing each of the parallax images 10a, 10b, 10c into horizontally long stripe images and alternately arranging them in the vertical direction. In this embodiment the division into the horizontal stripe images is also division every horizontal scan line of the image display element 1.

In Embodiment 2, it is assumed that, where k is an integer not less than 0, the (3k+1)th lines of the synthetic horizontal stripe parallax image are the stripes of the parallax image for the first view point E1, the (3k+2)th lines those for the second view point E2, and the (3k+3)th lines those for the third view point E3.

Figure 8:
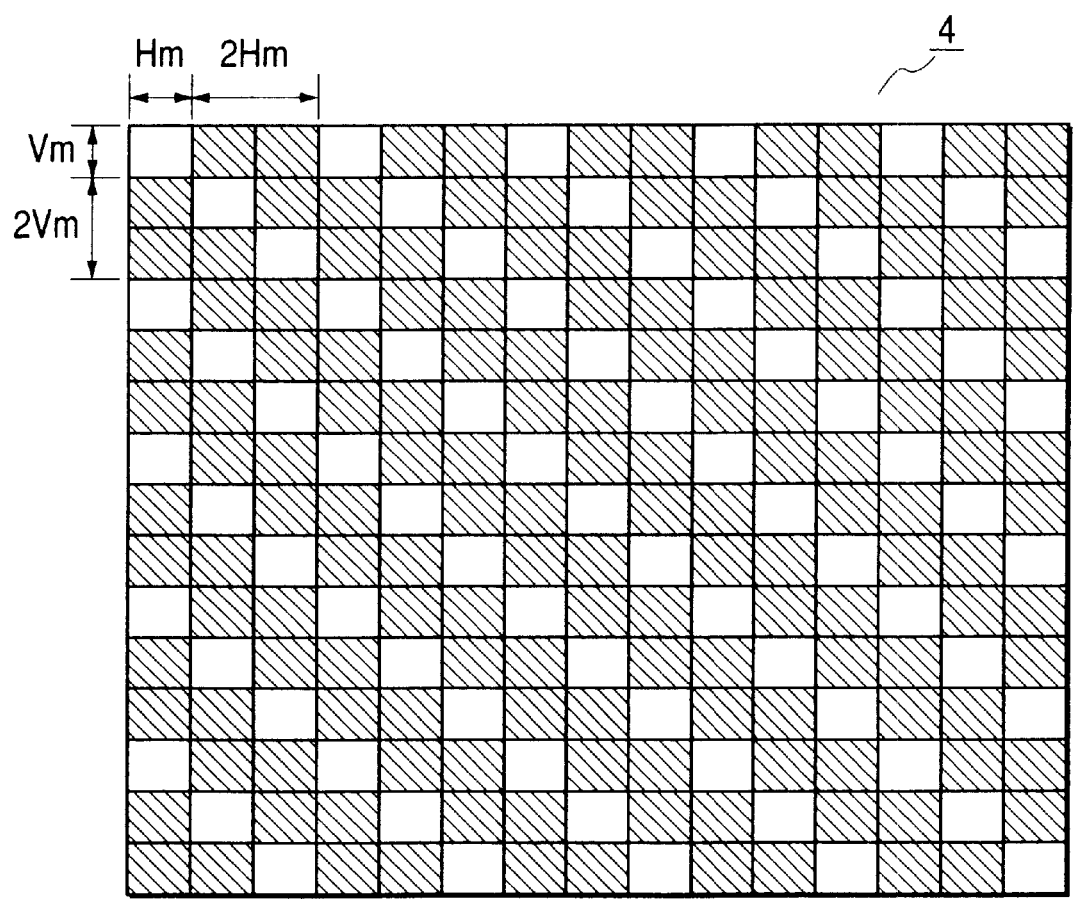
FIG. 8 is an explanatory diagram to illustrate a mask pattern in Embodiment 2 of the present invention.

FIG. 8 is a diagram to show the structure of the shield portions and opening portions in the checkered mask 4 used in Embodiment 2, in which where k is an integer not less than 0, the (3k+3)th horizontal lines correspond to the third view point and the horizontal stripe images 10c displayed in the (3k+3)th lines on the image display element 1, the (3k+2)th horizontal lines to the second view point and the horizontal stripe images 10b displayed in the (3k+2)th lines on the image display element 1, and the (3k+1)th horizontal lines to the first view point and the horizontal stripe images 10a displayed in the (3k+1)th lines on the image display element 1.

The horizontal widths of the opening portions and shield portions forming the checkered mask 4 are determined so that when the horizontal width of the opening portions is Hm, the width of the shield portions is Hm·(N−1) as illustrated in FIG. 8 (2·Hm in this embodiment, because N=3).

Figure 9:
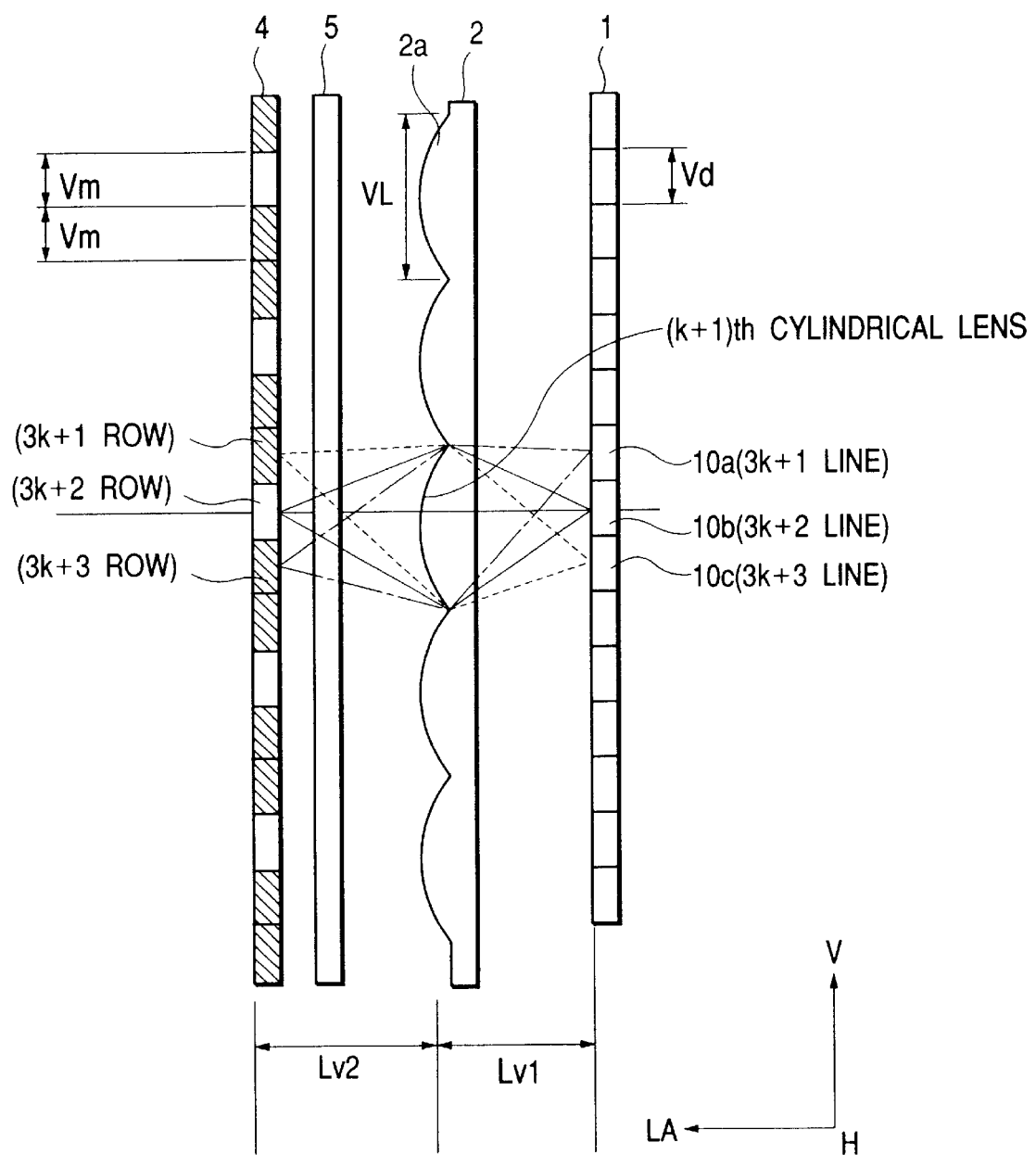
FIG. 9 is a vertical cross-sectional view for explaining the action in the vertical direction in Embodiment 2 of the present invention.

The vertical width of the cylindrical lenses 2a (the vertical pitch of the horizontal lenticular lens 2) forming the horizontal lenticular lens 2, being long in the horizontal direction, and having the optical power in the vertical direction is a value approximately equal to the vertical width of a set of three scan lines of the image display element 1 and to the vertical width of three horizontal lines of opening and shield portions forming the checkered mask 4, as illustrated in FIG. 9.

The (k+1)th cylindrical lens out of the cylindrical lenses 2 forming the horizontal lenticular lens 2 corresponds to a set of the (3k+1)th, (3k+2)th, and (3k+3)th horizontal stripe parallax images of three parallaxes in the synthetic horizontal stripe parallax image and to the (3k+1)th, (3k+2)th, and (3k+3)th lines out of the horizontal lines of the opening and shield portions forming the checkered mask 4.

The (3k+1)th, (3k+2)th, and (3k+3)th horizontal stripe parallax images are focused on the (3k+3)th, (3k+2)th, and (3k+1)th horizontal lines of opening and shield portions of the checkered mask 4 by the (k+1)th cylindrical lens of the horizontal lenticular lens 2.

The following relations are equations corresponding to the vertical relations of Eq. (V1) to Eq. (V4) of the design parameters described in Embodiment 1, where N is the number of view points.

$$Vd:Vm=LV1:LV2 \qquad (V1N)$$

$$2 \cdot N \cdot Vd:VL=LV1+LV2:LV2 \qquad (V2N)$$

$$1/LV1+1/LV2=1/fV \qquad (V3N)$$

$$N \cdot Vd:VL=LV0+LV1+LV2:LV0+LV2 \qquad (V4N)$$

(The definitions of the symbols indicating the parameters are the same as those in Embodiment 1 except for Vm.)

Vm represents the vertical width of the openings of the mask pattern and the vertical width of the shield portions is (N−1)·Vm (see FIG. 8 and FIG. 9).

Next, the optical action of Embodiment 2 will be described below referring to FIG. 9.

The layout of the opening and shield portions in the (3k+2)th and (3k+3)th horizontal lines on the checkered opening mask 4 is determined so that among the image display light from each pixel 10A of the horizontal line corresponding to the first view point E1 of the synthetic horizontal stripe parallax image 1 (the (3k+1)th line of the synthetic horizontal stripe parallax image), the light traveling toward the position of the view point E1 is converged on the opening portions of the checkered opening mask 4 by the horizontal lenticular lens 2 and the image display light traveling toward the positions of the view points E2, E3 is intercepted by the shield portions of the checkered opening mask 4.

The layout of the openings and shields of the (3k+2)th and (3k+3)th lines of the checkered opening mask 4 is set to be shifted by Hm each other in the horizontal direction, the (3k+2) lines are arranged to transmit only the image light traveling toward the view point E2, and the (3k+3)th lines to transmit only the image light traveling toward the view point E3.

The image display light transmitted by the checkered mask 4 is projected toward the view point E1, E2, or E3 by the first vertical lenticular lens 3.

The checkered opening mask 4 is placed on the focal plane of the first vertical lenticular lens 3, so that only the parallax image display light corresponding to the view point positions set at the predetermined distance determined by the opening positions of the checkered opening mask 4 and the first vertical lenticular lens 3 reaches the view points to present the display of a stereoscopic image of the N view points.

Figure 10:
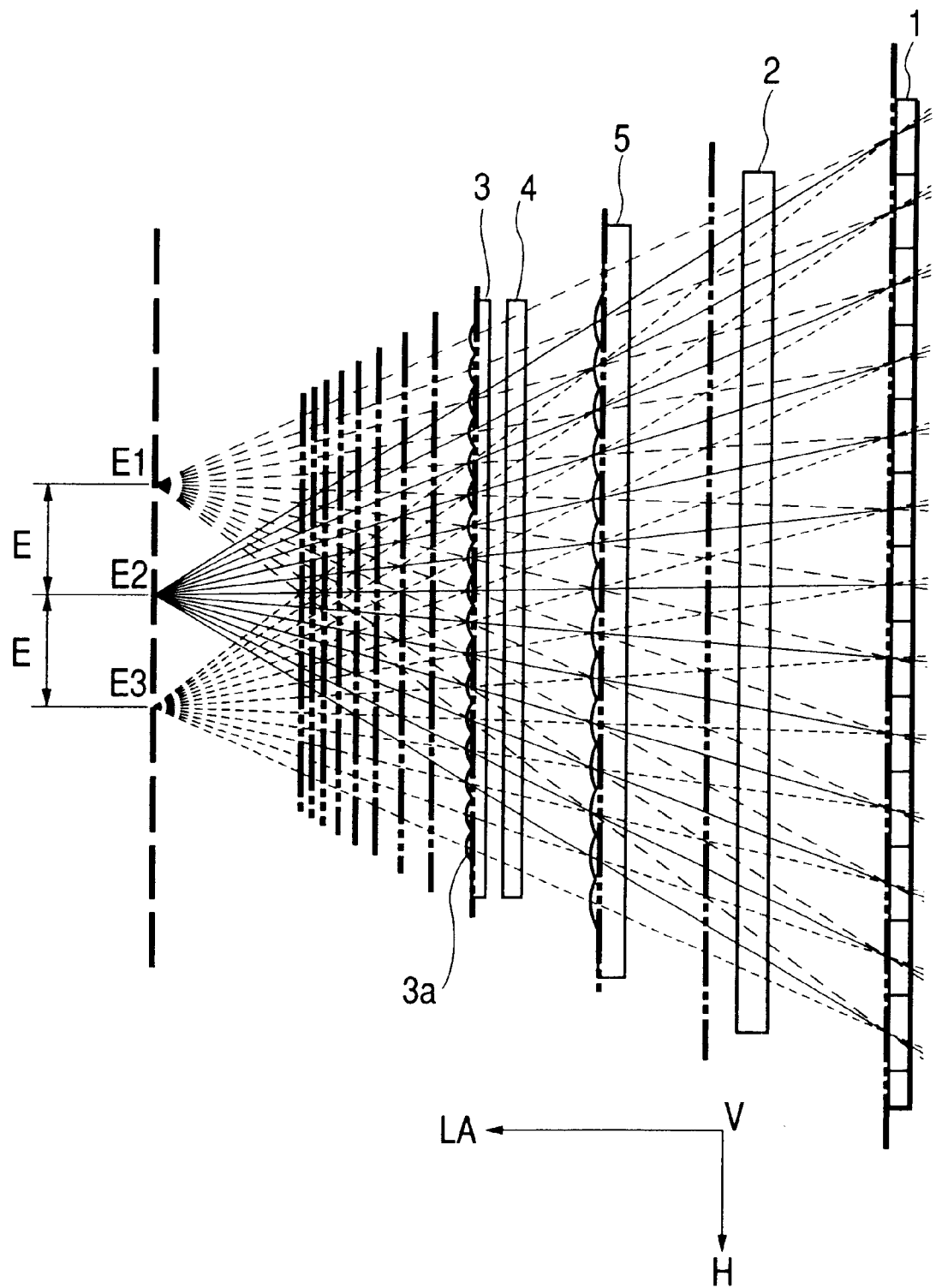
FIG. 10 is a horizontal cross-sectional view for explaining the action in the horizontal direction in Embodiment 2 of the present invention.

FIG. 10 shows the action in the horizontal direction (in the H-LA section).

In the present embodiment it is desirable to construct the apparatus so that the vertex of a cylindrical lens 3a forming the first vertical lenticular lens 3, the center of an opening or shield portion of the checkered opening mask 4, and the vertex of a cylindrical lens 5a forming the second vertical lenticular lens 5 are located on a straight line connecting either of the three view points E1, E2, E3 spaced at equal intervals of the eye-to-eye distance E on the observation surface, with each pixel on a horizontal pixel line of the image display element 1.

In this construction of the stereoscopic image display apparatus of the present invention, the first vertical lenticular lens 3 and the second vertical lenticular lens 5 can be placed on planes where the straight line groups connecting the three view points E1, E2, E3 and the pixels on the horizontal pixel lines of the image display element 1 meet (i.e., on the intersecting planes).

In FIG. 10 the second vertical lenticular lens 5 is placed on the first intersecting plane from the first vertical lenticular lens 3 and the image display element 1 on the second intersecting plane. It is noted that the intersecting planes of the line groups connecting the N view points spaced at the equal intervals and the pixels of the image display element 1 are the same planes as the intersecting planes of the line groups connecting two adjacent view points and the pixels of the image display element.

The relations corresponding to Eqs. (h1) to (h9) of the design parameters described in Embodiment 1 also hold without any change in the form in the case of the N view points, but some modification is necessary for the definitions as follows; how to count the intersecting planes is to determine the order of the intersecting planes of the line groups connecting two adjacent view points and the pixels of the image display element from the vertical lenticular lens 3 (Nd, NL2, etc.); Lh1a and Lh1b are the optical reduced distance from the first optical system to the mask member and the optical reduced distance from the checkered mask to the second intersecting plane.

Further, Hm is redefined as the horizontal width of the opening portions of the checkered mask 4 and the horizontal width of the shield portions is set to (N−1)·Hm.

$$Nd*HL1/E=Lhd/(Lhd+Lh0) \quad (H1)$$

$$Hd/HL1=(Lh0+Lhd)/Lh0 \quad (H2)$$

$$NL2*HL1/E=LhL2/(LhL2+Lh0) \quad (H3)$$

$$HL2/HL1=(Lh0+LhL2)/Lh0 \quad (H4)$$

$$H1/E=Lh1/(Lh1+Lh0) \quad (H5)$$

$$H1/HL1=(Lh0+Lh1)/Lh0 \quad (H6)$$

$$H1*Lh1a/Lh1=HL1*Lh1b/Lh1 \quad (H7)$$

$$Lh1a+Lh1b=Lh1 \quad (H8)$$

$$Hm/H1=Lh1a/Lh1 \quad (H9)$$

In this Embodiment 2, as also described in Embodiment 1, the locations of the image display element 1 and the second vertical lenticular lens 5 have degrees of freedom, and the optical members including the second vertical lenticular lens 5, the horizontal lenticular lens 2, and so on can be placed with such spacing as to cause no trouble in constructing the stereoscopic image display apparatus of the present embodiment, apart from the image display element 1.

As described above, according to the present invention, the directing of the image display light toward the view points is effected in the horizontal direction, regardless of the horizontal positions of the stripe images, by use of the optical systems placed before and after the mask member, so that there appear no dark portions without display light on the observation surface due to the so-called black matrix between pixel and pixel of the image display element and so that the observer can observe the stereoscopic image in good order without theoretically being affected by the scattering in the image display element and the diffraction in the pixel structure.

The present invention can thus achieve the stereoscopic image display method and the stereoscopic image display apparatus using it.

What is claimed is:

1. A stereoscopic image display apparatus for allowing an observer to observe a stereoscopic image by guiding image light onto a predetermined observation plane, comprising:

an image display element for displaying a synthesized parallax image by synthesizing stripe images for a left eye and stripe images for a right eye by alternately arranging the stripe images for a left eye and the stripe images for a right eye in a vertical direction, the stripe images for a left eye being a plurality of horizontally elongated images obtained by dividing a parallax image for a left eye and the stripe images for a right eye being a plurality of horizontally elongated images obtained by dividing a parallax image for a right eye;

a mask member including a plurality of openings and a plurality of shield regions;

a second optical system for converging light incoming from said image display element onto said mask member; and a first optical system for converging light incoming from said mask member onto the predetermined observation plane, wherein said second optical system includes a first lens array in which a plurality of first lenticular lenses are periodically arranged in a vertical direction and a second lens array in which a plurality of second lenticular lenses are periodically arranged in a horizontal direction, and wherein optical characteristics of the first lens array in a vertical direction and optical characteristics of the second lens array in a horizontal direction are different from each other.

2. A stereoscopic image display apparatus according to claim 1, wherein said first optical system includes a third lens array in which a plurality of third lenticular lenses are periodically arranged in a horizontal direction.

3. A stereoscopic image display apparatus according to claim 2, wherein each straight line connecting a pixel on a horizontal line of the image display element with a position of an observer's left eye or right eye passes through a vertex of a first lenticular lens, a center of an opening or a shield portion of the mask member, and a vertex of a third lenticular lens.

4. A stereoscopic image display apparatus for providing a stereoscopic image to an observer by guiding parallax image light for a left eye to a position which is in a vicinity of a left eye of the observer on a predetermined observation plane and guiding parallax image light for a right eye to a position which is in a vicinity of a right eye of the observer on the predetermined observation plane, comprising:

an image display element in which right eye pixel lines in each of which pixels are arranged in a horizontal direction and left eye pixel lines in each of which pixels are arranged in a horizontal direction are alternately arranged in a vertical direction;

a lateral lenticular lens for receiving light from said image display element, wherein said lateral lenticular lens comprises a plurality of lateral cylindrical lenses arranged in a vertical direction, the lateral cylindrical lenses having a refracting power in a vertical direction and substantially not having a refracting power in a horizontal direction;

a second longitudinal lenticular lens for receiving light from said lateral lenticular lens, wherein said second longitudinal lenticular lens comprises a plurality of second longitudinal cylindrical lenses arranged in a horizontal direction, the second longitudinal cylindrical lenses having refracting power in a horizontal direction and substantially not having refracting power in a vertical direction;

a mask member for receiving light from said second longitudinal lenticular lens, wherein said mask member has a plurality of openings and a plurality of shield portions arranged checkerwise; and a first longitudinal lenticular lens for receiving light from said mask member, wherein said first longitudinal lenticular lens comprises a plurality of first longitudinal cylindrical lenses arranged in a horizontal direction, the first longitudinal cylindrical lenses having refracting power in a horizontal direction and substantially not having refracting power in a vertical direction, wherein light from said first longitudinal lenticular lens is guided to the positions which are in the vicinity of the left eye and the vicinity of the right eye of the observer on the predetermined observation plane.

5. A stereoscopic image display apparatus for providing a stereoscopic image to an observer by guiding parallax image light for a left eye to a position which is in a vicinity of a left eye of the observer on a predetermined observation plane and guiding parallax image light for a right eye to a position which is in a vicinity of a right eye of the observer on the predetermined observation plane, comprising:

an image display element in which right eye pixel lines in each of which pixels are arranged in a horizontal direction and left eye pixel lines in each of which pixels are arranged in a horizontal direction are arranged in a vertical direction;

a micro lens array for receiving light from said image display element, wherein said micro lens array comprises toroidal lenses whose refracting power in a vertical direction and a refracting power in a horizontal direction are different;

a mask member for receiving a light from said micro lens array, wherein said mask member has a plurality of openings and a plurality of shield portions arranged checkerwise; and a longitudinal lenticular lens for receiving light from said mask member, wherein said longitudinal lenticular lens comprises a plurality of longitudinal cylindrical lenses arranged in a horizontal direction, the longitudinal cylindrical lenses having refracting power in a horizontal direction and substantially not having refracting power in a vertical direction, wherein light from said longitudinal lenticular lens is guided to the positions which are in the vicinity of the left eye and the vicinity of the right eye of the observer on the predetermined observation plane.

6. A stereoscopic image display apparatus for providing a stereoscopic image to an observer by guiding parallax image light for a left eye to a position which is in a vicinity of a left eye of the observer on a predetermined observation plane and guiding parallax image light for a right eye to a position which is in a vicinity of a right eye of the observer on a predetermined observation plane, comprising:

an image display element in which right eye pixel lines in each of which pixels are arranged in a horizontal direction and left eye pixel lines in each of which pixels are arranged in a horizontal direction are alternately arranged in a vertical direction;

a lateral lenticular lens for receiving light from said image display element, wherein said lateral lenticular lens comprises a plurality of lateral cylindrical lenses arranged in a vertical direction, the lateral cylindrical lenses having refracting power in a vertical direction and substantially not having refracting power in a horizontal direction;

a second longitudinal lenticular lens for receiving light from said lateral lenticular lens, wherein said second longitudinal lenticular lens comprises a plurality of second longitudinal cylindrical lenses arranged in a horizontal direction, the second longitudinal cylindrical lenses having refracting power in a horizontal direction and substantially not having refracting power in a vertical direction;

a mask member for receiving light from said second longitudinal lenticular lens, wherein said mask member has a plurality of substantially rectangular openings and shield regions having a plurality of rectangular shields, wherein the rectangular openings are arranged so that the position of each of said plurality of rectangular openings is shifted with respect to a neighboring rectangular opening by a common distance in a common direction and the shield regions are arranged so that the position of each of said plurality of rectangular shields is shifted with respect to a neighboring rectangular shield by a common distance in the common direction; and a first longitudinal lenticular lens for receiving light from said mask member, wherein said first longitudinal lenticular lens comprises a plurality of first longitudinal cylindrical lenses arranged in a horizontal direction, the first longitudinal cylindrical lenses having refracting power in a horizontal direction and substantially not having refracting power in a vertical direction, wherein light from said first longitudinal lenticular lens is guided to the positions which are in the vicinity of the left eye and the vicinity of the right eye of the observer on the predetermined observation plane.

7. A stereoscopic image display apparatus according to claim 6, wherein the plurality of substantially rectangular openings are positioned to contact at opposing corners of each of rectangular openings with each other.

8. A stereoscopic image display apparatus for providing a stereoscopic image to an observer by guiding parallax image light for a left eye to a position which is a vicinity of a left eye of the observer on a predetermined observation plane and guiding parallax image light for a right eye to a position which is in a vicinity of a right eye of the observer on the predetermined observation plane, comprising:

an image display element in which right eye pixel lines in each of which pixels are arranged in a horizontal direction and left eye pixel lines in each of which pixels are arranged in a horizontal direction are alternately arranged in a vertical direction;

a micro lens array for receiving light from said image display element, wherein said micro lens array comprises toroidal lenses whose refracting power in a vertical direction and refracting power in a horizontal direction are different;

a mask member for receiving light from said micro lens array, wherein said mask member has a plurality of substantially rectangular openings and shield regions having a plurality of rectangular shields, wherein the rectangular openings are arranged so that the position of each of said plurality of rectangular openings is shifted with respect to a neighboring rectangular opening by a common distance in a common direction and the shield regions are arranged so that the position of each of said plurality of rectangular shields is shifted with respect to a neighboring rectangular shield by a common distance in the common direction; and a longitudinal lenticular lens for receiving light from said mask member, wherein said longitudinal lenticular lens comprises a plurality of longitudinal cylindrical lenses arranged in a horizontal direction, the longitudinal cylindrical lenses having refracting power in a horizontal direction and substantially not having refracting power in a vertical direction, wherein light from said longitudinal lenticular lens is guided to the positions which are in the vicinity of the left eye and the vicinity of the right eye of the observer on the predetermined observation plane.

* * * * *

UNITED STATES PATENT AND TRADEMARK OFFICE
CERTIFICATE OF CORRECTION

PATENT NO. : 7,064,895 B2
APPLICATION NO. : 09/772989
DATED : June 20, 2006
INVENTOR(S) : Hideki Morishima et al.

It is certified that error appears in the above-identified patent and that said Letters Patent is hereby corrected as shown below:

COLUMN 12:
Line 53, "(3k+2) lines" should read --(3k+2)th lines--.

COLUMN 15:
Line 45, "are arranged" (2nd occurrence) should read --are alternately arranged--.

Signed and Sealed this

Twenty-sixth Day of December, 2006

JON W. DUDAS
*Director of the United States Patent and Trademark Office*